(12) United States Patent
Gillette

(10) Patent No.: US 7,347,091 B2
(45) Date of Patent: *Mar. 25, 2008

(54) INTEGRATED FOG FREE MIRROR AND WEATHER STATION

(75) Inventor: Jeffrey E. Gillette, 844 W. 830 N., Orem, UT (US) 84057

(73) Assignee: Jeffrey E. Gillette, Orem, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 11/825,484

(22) Filed: Jul. 6, 2007

(65) Prior Publication Data

US 2007/0251312 A1    Nov. 1, 2007

Related U.S. Application Data

(62) Division of application No. 11/212,231, filed on Aug. 26, 2005, now Pat. No. 7,305,876.

(51) Int. Cl.
*G01W 1/00* (2006.01)
(52) U.S. Cl. .................................. 73/170.16
(58) Field of Classification Search ............. 73/170.16; 702/3, 63, 122; 359/512, 509; 4/605
See application file for complete search history.

(56) References Cited

U.S. PATENT DOCUMENTS

| | | | |
|---|---|---|---|
| 5,402,265 A | 3/1995 | Jahoda et al. | |
| 5,408,069 A | 4/1995 | Mischel, Jr. | |
| 5,920,827 A | 7/1999 | Baer et al. | |
| 5,953,157 A | 9/1999 | Christianson | |
| 6,031,579 A | 2/2000 | Stephenson | |
| 6,149,277 A | 11/2000 | Broussard | |
| 6,420,682 B1 | 7/2002 | Sellgren et al. | |
| 6,443,578 B1 | 9/2002 | Finnigan | |
| 6,619,805 B1 | 9/2003 | Roth | |
| 6,799,335 B1 | 10/2004 | Zadro | |

OTHER PUBLICATIONS

U.S. Appl. No. 11/212,231, Jeffrey E. Gillette.*

* cited by examiner

*Primary Examiner*—Jewel Thompson
(74) *Attorney, Agent, or Firm*—Bryan G. Pratt; Rader Fishman & Grauer PLLC

(57) ABSTRACT

A system for planning wardrobe and activities includes a weather sensing unit configured to wirelessly transmit weather conditions, a weather condition display module configured to receive the transmitted weather conditions, and a reflective surface integrally coupled to the weather condition display.

18 Claims, 8 Drawing Sheets

INTEGRATED FOG FREE MIRROR AND WEATHER STATION

RELATED APPLICATION

The present specification is a Divisional and claims priority under 35 U.S.C. § 121 of U.S. patent application Ser. No. 11/212,231 filed Aug. 26, 2005 now U.S. Pat. No. 7,305,876 titled "Integrated Mirror and Weather Station," which application is incorporated herein by reference in its entirety.

FIELD

The present system and method relate to mirrors. More particularly, the present system and method relate to a mirror having a weather station intimately associated therewith.

BACKGROUND

Showering and grooming is an activity frequently undertaken by people one or more times a day. In addition to washing, both women and men often choose to perform other grooming tasks while in the shower. Many men prefer to shave their faces while their beard is softened by the steam and hot water in the shower, reducing the likelihood for skin irritation, and by shaving in the shower, shaving cream or gel can also be rinsed from the face more thoroughly. However, typically a mirror is required to properly guide the razor used to shave the face while minimizing the chance of cutting or nicking. Additionally, both men and women would often like to be able to see themselves as they shampoo their hair. In particular, it may be helpful to be able to see if they have fully rinsed shampoo, conditioner, and other hair care products from their hair before leaving the shower. Many women also chose to remove makeup, apply skin treatments, or pluck eyebrows in the warm, humid environment of the shower. Further, women often like to apply skin treatments immediately after a hot shower while their skin is still moist and soft. Such grooming cannot be done in front of a conventional mirror, because in a steamy shower or bathroom, a thick layer of condensation forms on the mirror and completely obscures it.

Typically, both men and women take their showers in the morning when they are preparing for the day, or later in the evening when they are preparing for scheduled evening activities. For many, the time in the warm humid environment of the shower provides a relaxing moment in which to plan out the day's wardrobe and activities. However, many traditional showers are located in bathrooms absent significant exposure to the outside elements to aid in the selection of wardrobe and/or activities.

SUMMARY

An exemplary system for planning wardrobe and activities includes a weather sensing unit configured to wirelessly transmit weather conditions, a weather condition display module configured to receive the transmitted weather conditions, and a reflective surface integrally coupled to the weather condition display.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary system and method for detecting outside weather conditions and displaying the weather conditions to a user during their daily preparations are disclosed herein. Specifically, the present exemplary system and method provides a system that detects useful information such as weather and time conditions useful to a user in planning their daily activities, provides the useful information to a user in a convenient display, and provides an integral mirror component so that the useful time and weather conditions may be viewed during shower and other daily preparations. Embodiments and examples of the present exemplary systems and methods will be described in detail below.

Unless otherwise indicated, all numbers expressing quantities, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

In the following description, for purposes of explanation, numerous specific details are set forth in order to provide a thorough understanding of the present system and method for detecting outside weather conditions and displaying the weather conditions to a user during their daily preparations. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary System

Figure 1:
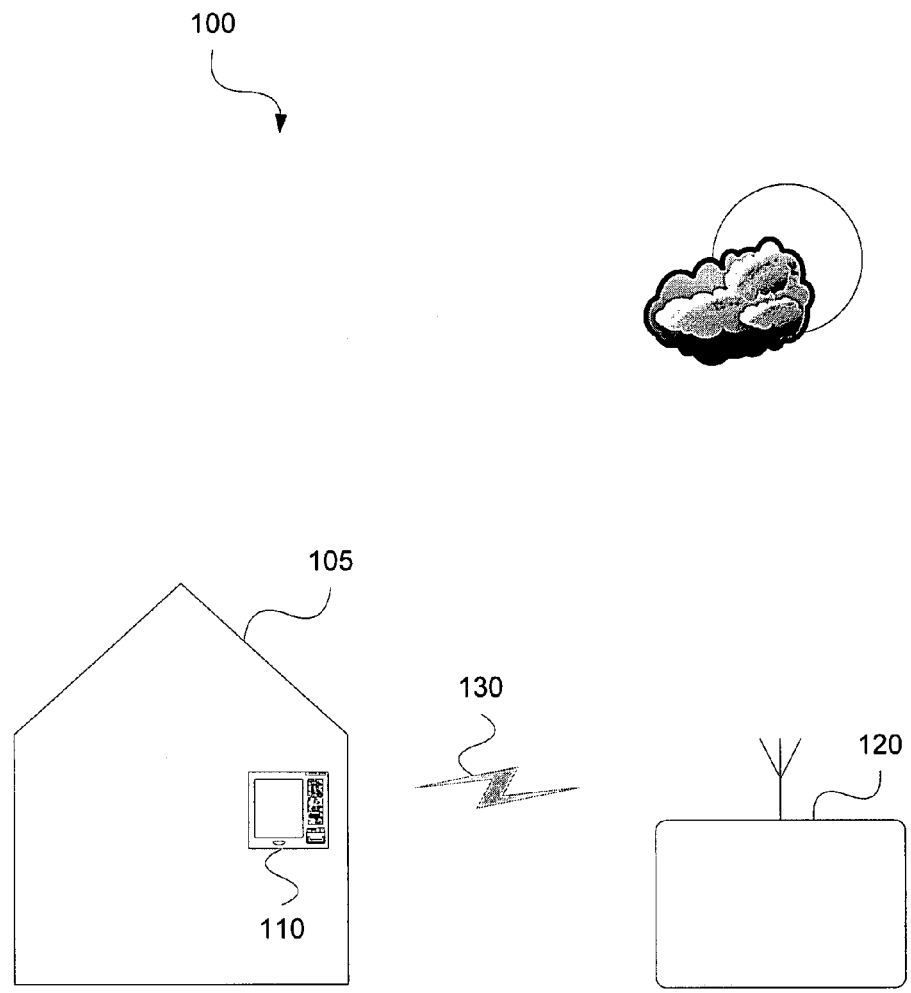
FIG. 1 is a system view of an integrated mirror and weather station system, according to one exemplary embodiment.

FIG. 1 illustrates an integrated mirror and weather system (100), according to one exemplary embodiment. As illustrated in FIG. 1, the exemplary integrated mirror and weather system (100) includes a display unit (110) located within a house (105) or other occupant structure. The display unit (110) is communicatively coupled to an external condition sensor module (120) via a wireless communication link (130). During operation, the condition sensor (120) is activated, via the wireless communication link (130), wherein the condition sensor (120) begins to detect outside weather conditions and transmits the detected weather conditions, via the wireless communication link (130), to the display unit (110). With the detected weather condition information displayed on the display unit (110), the user may continue preparing for the day while cognizant of outside conditions. A number of exemplary details of the independent components of the exemplary integrated mirror and weather system (100) will be provided below with reference to FIGS. 2 through 7.

Display Unit

Figure 2:
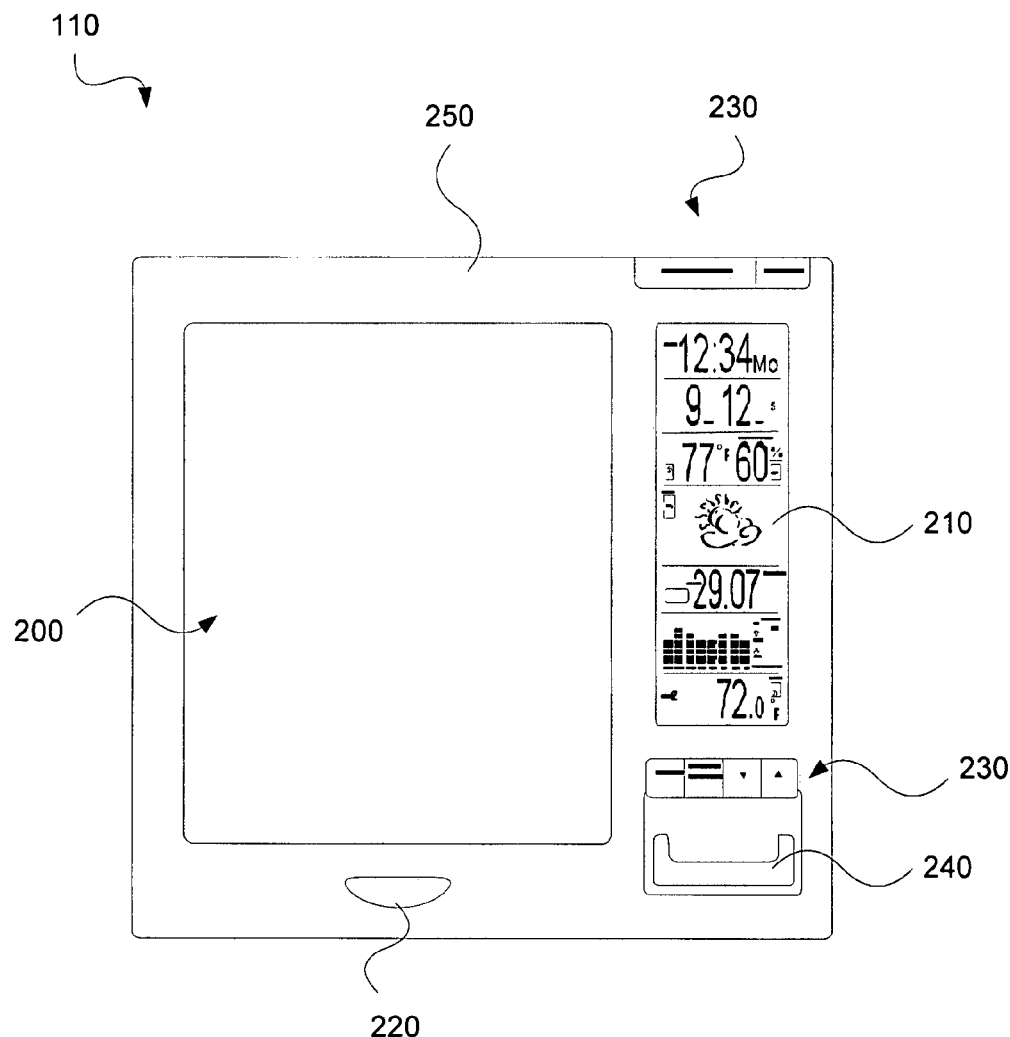
FIG. 2 is a front view illustrating the components of a display unit of the exemplary integrated mirror and weather station system of FIG. 1, according to one exemplary embodiment.
Figure 3:
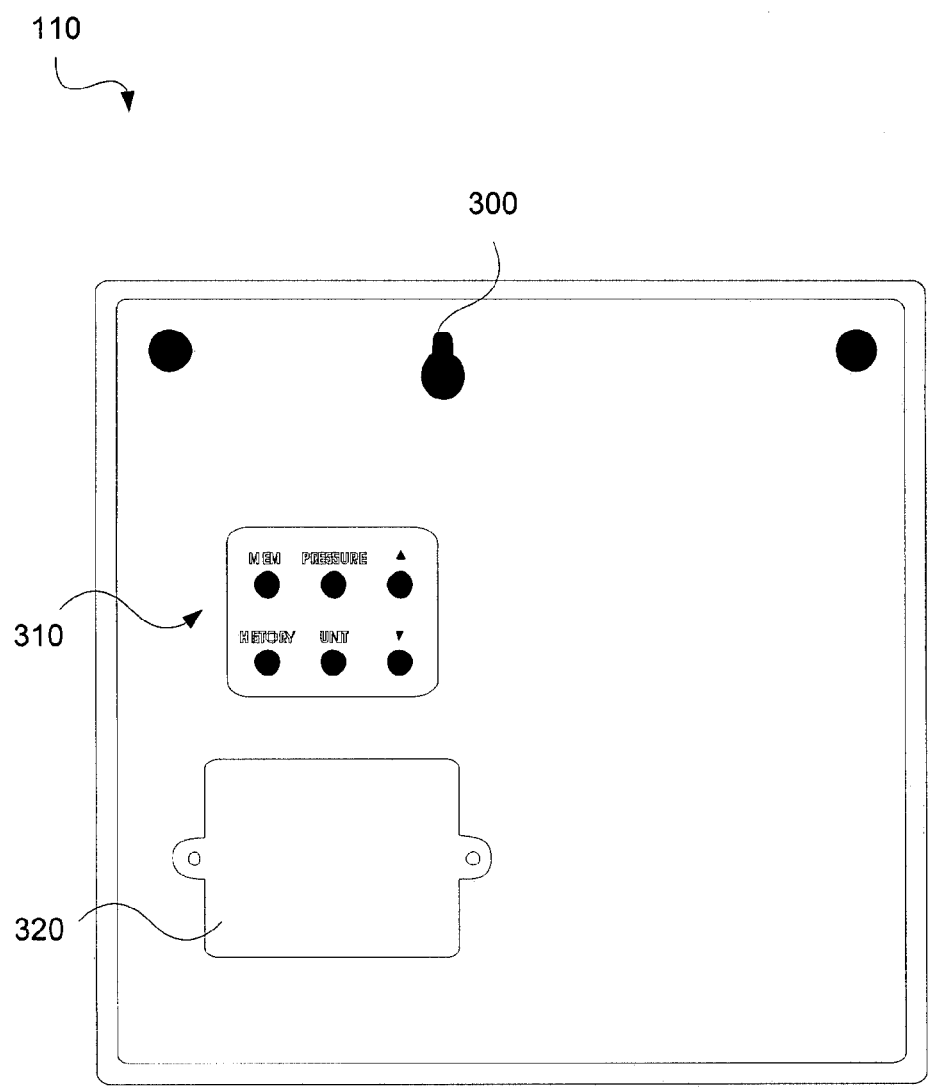
FIG. 3 is rear view illustrating the components of a display unit of the exemplary integrated mirror and weather station system of FIG. 1, according to one exemplary embodiment.

FIGS. 2 and 3 illustrate various views of a display unit (110), according to one exemplary embodiment. As illustrated in FIG. 2, the front portion of the exemplary display unit (110) includes a number of display components including, but in no way limited to, a mirror (200), a weather station display (210), a number of controls (230), a razor holder, and a light member (220). As illustrated, the various components of the display unit (110) are retained within a housing member (250). As shown, the mirror (200) and the weather station module (210) are disposed adjacent to one another facilitating easy viewing of the weather station icons while shaving or performing other daily preparation activities with the mirror.

According to the exemplary embodiment illustrated in FIG. 2, the light member (220) may be any number of light generating devices configured to provide a user added light when using the present display unit (110). More particularly, the exemplary light may include, but is in no way limited to, a number of light emitting diodes (LEDs) due to their low cost and high utility. According to one exemplary embodiment, the light member (220) may also be coupled to an internal timer configured to turn off the light member (220) after a pre-determined amount of time if left on.

FIG. 2 also illustrates a number of controls (230) formed in the housing member (250). According to one exemplary embodiment, the various controls (230) may be used to turn on and otherwise control the operation of the present integrated mirror and weather station system (100; FIG. 1). More particularly, according to one exemplary embodiment, the controls (230) may include, but are in no way limited to, a MODE button configured to change the display modes, activities, and settings of the weather station module (210); an ALARM button configured to set weekday and single alarms on the weather station, and allow for display of the alarm status; an UP button configured to allow increments of a selected parameter value and activate an atomic clock receiver; a DOWN button configured to decrement selected parameter values and enforce remote sensor channel signal research; a CHANNEL button configured to recall the different remote condition sensor modules (120) and enable an auto scan feature; and a SNOOZE/LIGHT button configured to temporarily stop an alarm and/or activate an LCD EL-backlight.

Additionally, the back portion of the exemplary display unit (110) illustrated in FIG. 3 includes a mounting orifice (300), a number of data access controls (310), and a power cover (320). According to the exemplary embodiment illustrated in FIGS. 2 and 3, the display unit (110) is configured to be mounted on a shower wall, or other convenient surface. Consequently, the illustrated mounting orifice (300) is a keyhole mounting orifice. Alternatively, any number of mounting means may be used to mount the exemplary display unit on a desired surface including, but in no way limited to, a cable, a rope, an adhesive, and the like. Additionally, as mentioned, the present exemplary display unit is configured to be mounted and displayed in a shower or other humid environment. Consequently, the power cover (320), configured to provide access to a compact power source, may include any number of rings or gaskets, along with mechanical coupling means, to assure a substantially hermetic seal.

According to the exemplary embodiment illustrated in FIG. 3, the data access controls (310) may be used to access infrequently desired information from the weather station module (210). More specifically, according to one exemplary embodiment, the data access controls may include, but are in no way limited to, a MEMORY button configured to recall current, maximum, and/or minimum temperature and humidity values and, upon extended actuation thereof, clear all memory readings; a HISTORY button configured to recall current local barometric pressure or pressure history for a previous period of time; an UP button configured to scan through a moon phase; a DOWN button configured to scan through a moon phase; and a UNIT button configured to select pressure, temperature, or other empirical display units. While both the front controls (230; FIG. 2) and the rear data access controls (310) are described herein as having particular functions, it should be understood that the button positions, as well as their various functionalities may be varied, according to a number of exemplary embodiments.

Figure 4:
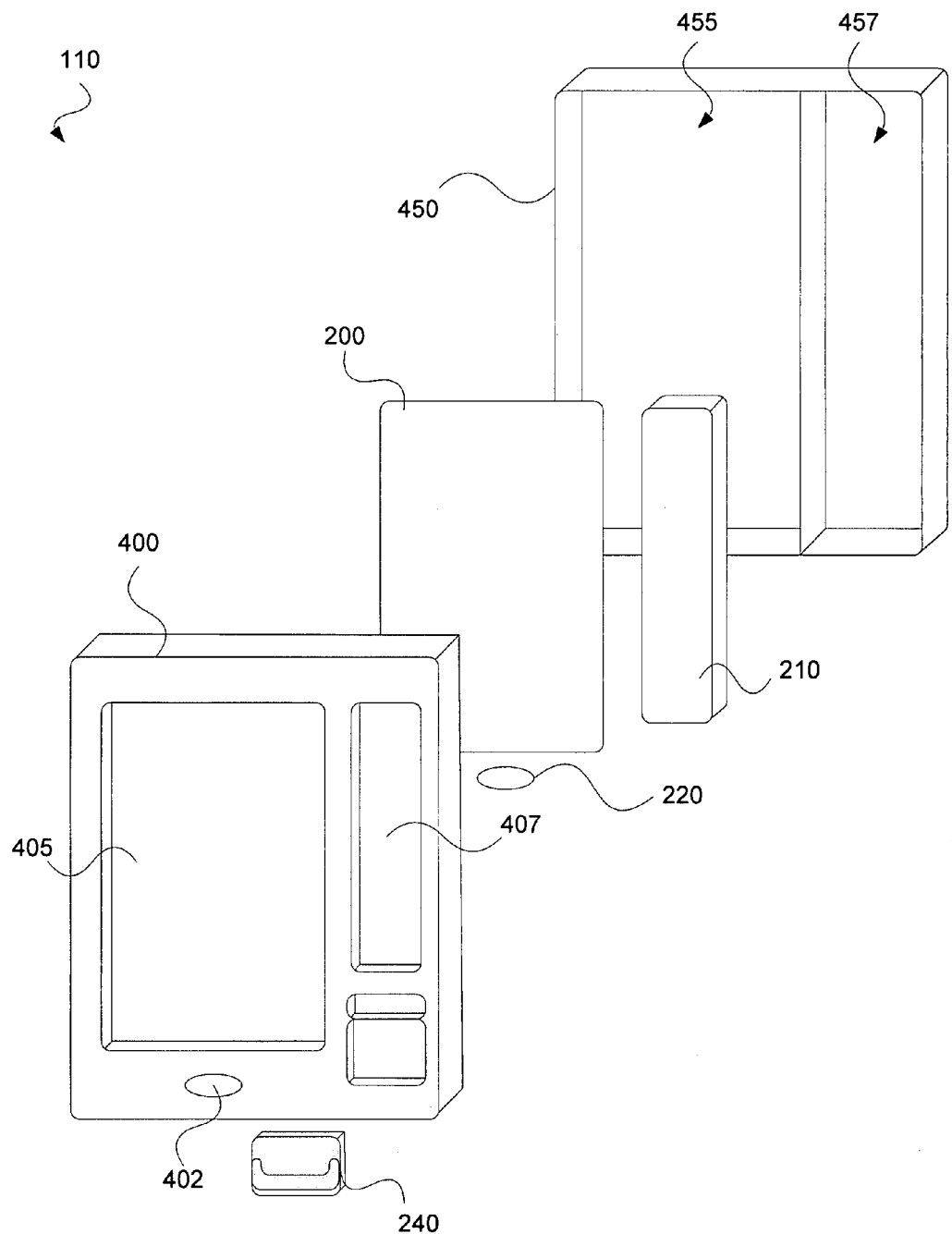
FIG. 4 is an exploded perspective view illustrating the components of a display unit of the exemplary integrated mirror and weather station system of FIG. 1, according to one exemplary embodiment.

Continuing with FIG. 4, an exploded view illustrating the relative assembly of the various components of the exemplary display unit (110) is shown. According to the exemplary embodiment illustrated in FIG. 4, the mirror (200), the weather station module (210), the light (220), and the razor holder (240) are coupled between the housing member (250; FIG. 2) in the form of a front housing member (400) and a rear housing (450).

As illustrated, the front housing member (400) includes a number of orifices formed therein, such as a mirror orifice (405), a weather station orifice (407), and a light orifice (402). As illustrated in FIG. 4, each of the formed orifices is slightly smaller than the corresponding component, to allow the component to be positioned behind the orifice, while maintaining access thereto.

In order to maintain a hermetic seal within the housing member (250; FIG. 2), the rear housing (450) may include a plurality of compartments such as a mirror compartment (455) associated with the mirror (200), and a weather station compartment (457) associated with the position and size of the weather station member (210). According to one exemplary embodiment, the outer surfaces of the weather station compartment may include a compressible seal material configured to be compressed against the front housing (400), during assembly of the display unit (100), to hermetically seal the weather station within the housing member (250; FIG. 2). Additionally, the razor holder (240) may be adhesively coupled to the front housing member (400) to prevent forming an orifice in the front housing member that may compromise the hermeticity of the weather station compartment (457). Alternatively, the weather station module (210) may be independently hermetically sealed to protect the weather station from water damage.

As mentioned, the front housing member (400) and the rear housing member (450) may be matingly coupled to form the hermetically sealed weather station compartment (457). According to the exemplary embodiment illustrated in FIG. 4, the front housing member (400) and the rear housing member (450) may be coupled by any number of adhesives and/or mechanical fastening means known in the art. Additionally, the front housing member (400) and the rear housing member (450) may be formed to have mating and interlocking protrusions. Both the front housing member (400) and the rear housing member (450) may be formed from any number of materials and by any number of manufacturing methods. More specifically, the front housing member (400) and the rear housing member (450) may be made of any number of polymers, metals, composites, or combinations thereof. Additionally, the front housing member (400) and the rear housing member (450) may be made by injection molding, deep draw molding, blow molding, stamping, and the like.

Figure 5A:
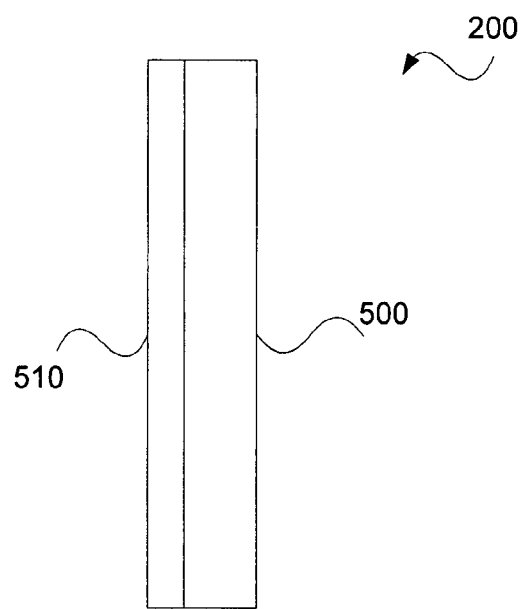
FIG. 5A is a side view illustrating the construction of a fog free mirror, according to one exemplary embodiment.
Figure 5B:
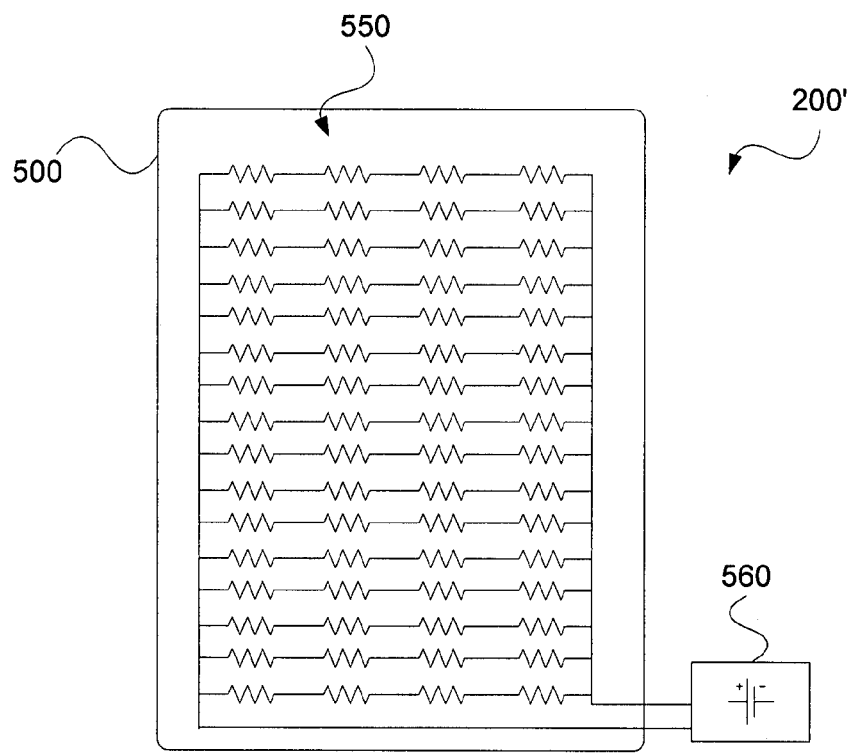
FIG. 5B is a rear view illustrating the components of a fog free mirror, according to one exemplary embodiment.

As mentioned previously, the present exemplary display unit (110) is configured to be used in a shower or other humid environment, such as while a user is preparing for a day's activities. Consequently, according to one exemplary embodiment, the mirror (200) comprises a fog free mirror. FIGS. 5A and 5B illustrate various embodiments that the fog free mirror may assume. According to one exemplary embodiment, illustrated in FIG. 5A, the fog free mirror (200) includes a reflective substrate (500) and a fog resistant coating (510). More particularly, according to one exemplary embodiment, the fog resistant coating (510) includes an organic coating of anti-fog material.

According to this exemplary embodiment, the anti-fog material forming the fog resistant coating (510) may include, but is in no way limited to, any of the well known and commercially available coatings such as supplied by Hydromer, Inc. of Whitehouse, N.J.; their coating material number 2009-68-2, or by Film Specialties, Inc., also of Whitehouse, N.J.; their product VISTEX™ fog-free film. The anti-fog material forming the fog resistant coating (510) may be coupled to the reflective substrate by any number of water resistant adhesives.

Additionally, according to the exemplary embodiment illustrated in FIG. 5A, the reflective substrate (500) may be any number of known reflective substrates. More particularly, according to one exemplary embodiment, the reflective substrate (500) may include, but is in no way limited to, a film sheet having a reflective metal coating or a glass substrate having a reflective metal coating formed thereon.

Alternative to the fog resistant coating embodiment illustrated in FIG. 5A, FIG. 5B illustrates a fog free mirror configuration (200'), according to one exemplary embodiment. According to the illustrated embodiment, the fog free mirror configuration (200') includes a reflective substrate (500), similar to the reflective substrate described with respect to FIG. 5A. However, as illustrated in FIG. 5B, the exemplary fog free mirror configuration (200') includes a resistor array (550) coupled to the back surface thereof. Additionally, a power supply (560) is electrically coupled to the resistor array (550). The power supplied to the resistor array (550) is then converted to thermal energy which is then transferred to the reflective substrate (500), thereby preventing condensation on the surface of the reflective substrate. While a number of fog free mirror configurations were illustrated with respect to FIGS. 5A and 5B, the fog free mirror is in no way limited to the illustrated embodiments. Rather, the fog free mirror may assume any number of configurations including, but in no way limited to the fog free mirror configurations illustrated in U.S. Pat. Nos. 5,604,633; 6,149,277; 5,408,069; 5,953,157; 5,402,265; 6,420,682; 6,443,578; and U.S. Pat. No. 6,619,805, the contents of which are incorporated herein by reference in their entireties.

Figure 6:
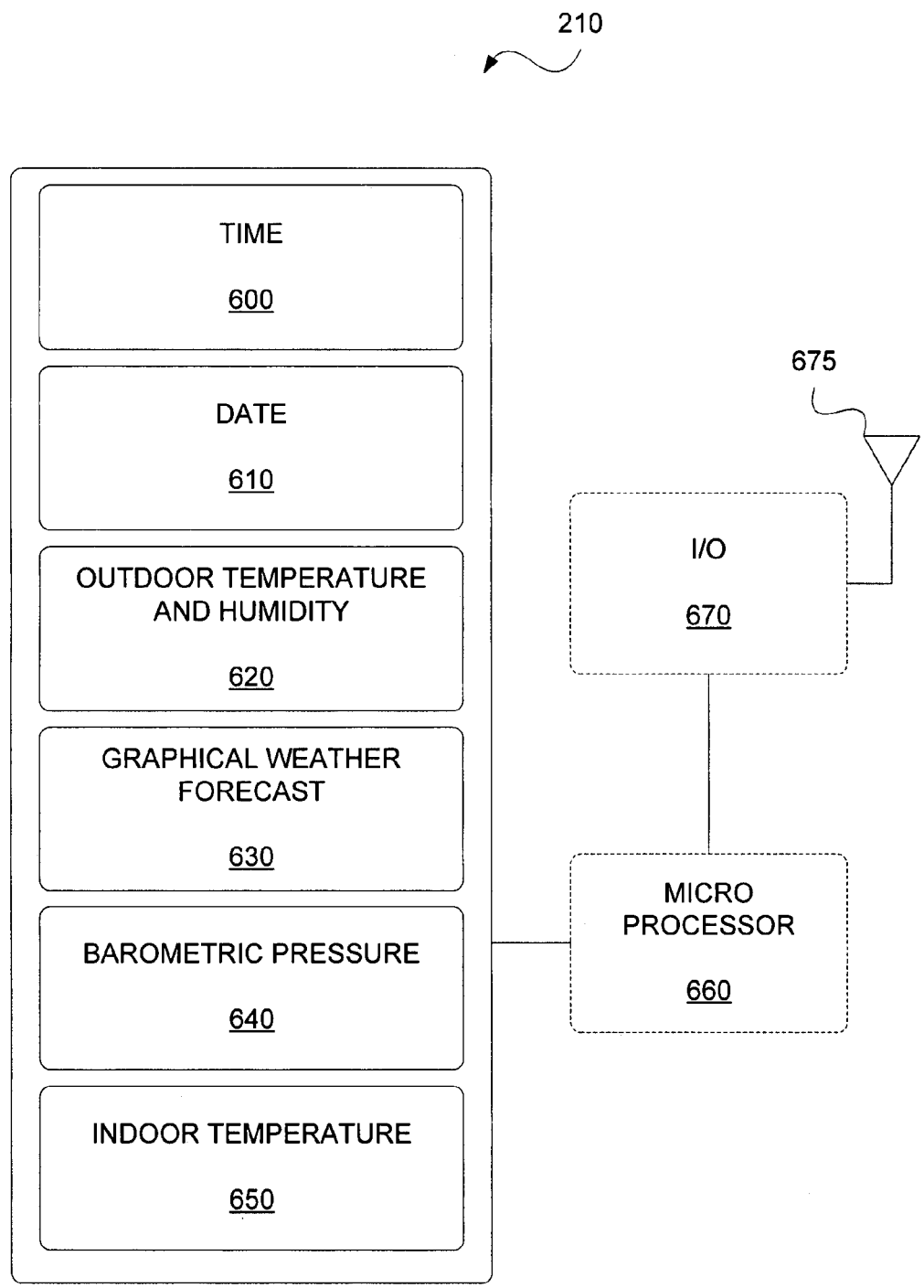
FIG. 6 is a block diagram illustrating a weather station display configuration, according to one exemplary embodiment.

As illustrated in FIG. 2, the weather station module (210) is disposed adjacent to the mirror (200) for ease of viewing when using the mirror. FIG. 6 illustrates a weather station module (210) configuration, according to one exemplary embodiment. While FIG. 2 illustrates a specific display arrangement, the position and content of each of the information modules may vary according to user and/or manufacturer preferences. As illustrated in FIG. 6, the weather station module (210) may include, but is in no way limited to, a time display module (600), a date display module (610), an outdoor temperature and humidity display module (620), a graphical weather forecast display module (630), a barometric pressure display module (640), and an indoor temperature module (650). According to one exemplary embodiment, the various display modules of the weather station module (210) may be independent display modules, or merely isolated portions of a single display screen. According to one exemplary embodiment, the display of the weather station module (210) may include, but is in no way limited to, a liquid crystal display (LCD), a plurality of light emitting diodes (LEDs), an organic light emitting devices (OLED), light emitting polymer (LEP) display, and the like. According to one exemplary embodiment, the display of the weather station may include an electroluminescent LCD display configured to provide easy viewing in limited light.

According to one exemplary embodiment, the time display module (600) and the date display module (610) are configured to display the current time and date to a user. According to one exemplary embodiment, the precise time and date of the time display module (600) and the date display module (610) may be set via RF signal from the U.S. Atomic Clock in Colorado, as is known in the art. Additionally, according to one exemplary embodiment, the various displays of the weather station module (210) may present information in any number of formats including, but in no way limited to, numerical representations, graphical representations, chart form, and/or various languages.

Further, according to the exemplary embodiment illustrated in FIG. 6, a microprocessor (660) and an input/output module (670) may be communicatively coupled to the weather station module (210). According to this exemplary embodiment, the input/output module (670) including an antenna (675) is configured to receive and transmit wireless data to and from the condition sensor module (120; FIG. 1). Once data is received by the input/output module (670), it is transferred to the microprocessor (660) for conditioning and/or transmission to one of the previously mentioned display modules for display.

Condition Sensor Module

Figure 7:
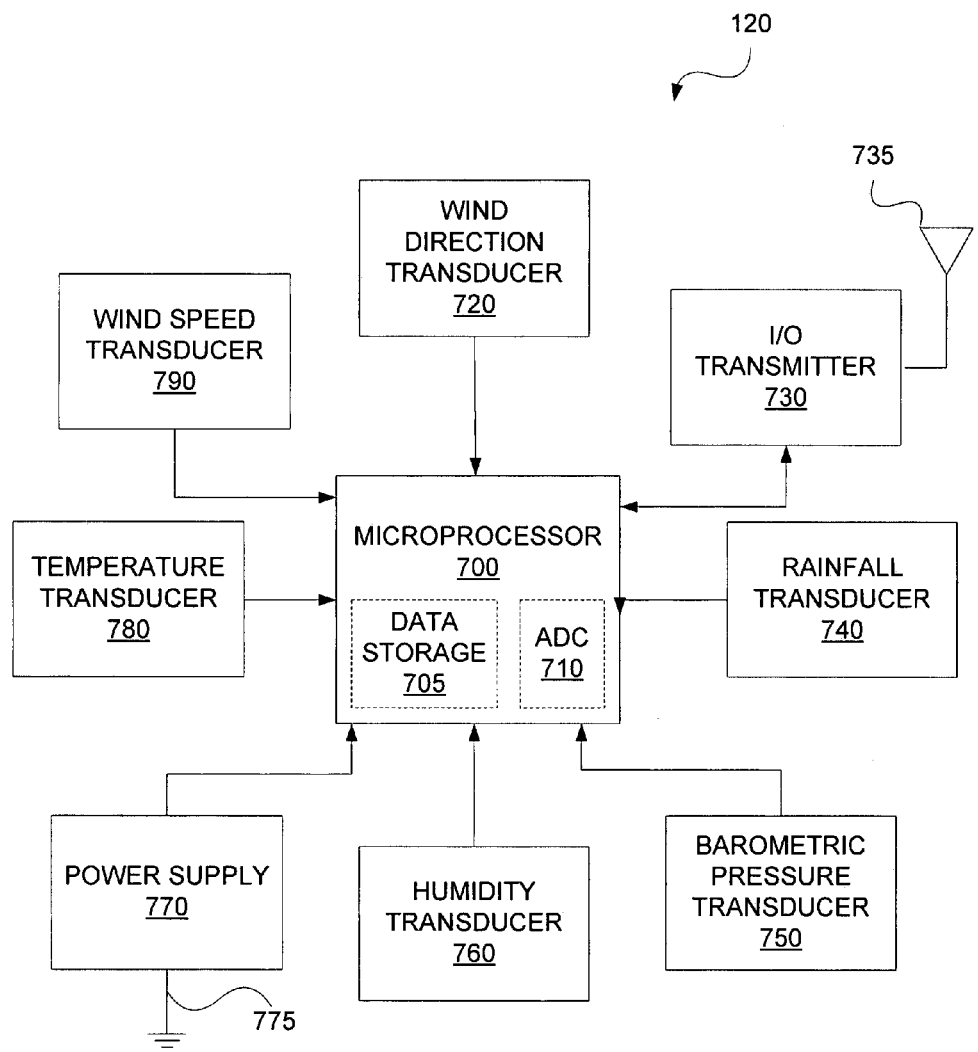
FIG. 7 is a block diagram illustrating the components of a condition sensing module of the exemplary integrated mirror and weather station system of FIG. 1, according to one exemplary embodiment.

Returning to FIG. 1, the exemplary display unit (110) receives outside weather data from a condition sensor module (120) via a wireless data link (130). While FIG. 1 only illustrates a single condition sensor module (120) wirelessly communicating with the exemplary display unit (110), any number of single condition sensor modules (120) may be incorporated by the present integrated mirror and weather station system (100). FIG. 7 further illustrates the components of a condition sensing module (120), according tone exemplary embodiment. As illustrated in FIG. 7, the condition sensing module may include, but is in no way limited to, a microprocessor (700) including an analog to digital converter (ADC) (710), a power supply (770), an input/output transmitter (730), and a number of weather condition transducers. According to the exemplary embodiment illustrated in FIG. 7, the condition sensing module (120) includes a wind direction transducer (720), a rainfall transducer (740), a barometric pressure transducer (750), a humidity transducer (760), a temperature transducer (780), and a wind speed transducer (790). The various components of the condition sensing module will be described in further detail below.

As illustrated, the condition sensing and control operations of the condition sensing module (120) are controlled by the microprocessor (700). According to one exemplary embodiment, the microprocessor (700) may include, but is in no way limited to, a central processing unit (CPU), a microprocessor, or any other device made from miniaturized transistors and other circuit elements on one or more semiconductor integrated circuits (IC). According to the exemplary embodiment illustrated in FIG. 4, the microcontroller (400) is configured to receive commands from the display unit (110; FIG. 1), receive inputs from the various condition transducers coupled thereto, and to transmit desired condition information to the display unit (110; FIG. 1). According to the exemplary embodiment illustrated in FIG. 7, the microprocessor (700) may include an analog to digital converter (710) configured to receive analog signals from the various condition transducers and convert them into digital information that may be transmitted to, and displayed by, the display unit (110; FIG. 1). Additionally, the microprocessor (700) may include a data storage module (705) configured to store collected data. According to one exemplary embodiment, the data storage module (705) may include, but is in no way limited to, a flash drive, read only memory (ROM), random access memory (RAM), and the like.

Additionally, a power supply (700) is electrically coupled to the microprocessor (700) and to ground (775). According to one exemplary embodiment, the power used to operate the entire condition sensing module (120) is provided by the single power supply (770) coupled to the microprocessor (700). According to one exemplary embodiment, the power supply (770) may include any number of replaceable power cells including, but in no way limited to, a plurality of AA (1.5V) alkaline batteries. Additionally, the replaceable power cells may be replaced by or supplemented by a solar panel and a number of regulators (not shown) configured to convert solar energy to electrical energy.

Continuing with FIG. 7, an input/output transmitter (730) including an antenna (735) is communicatively coupled to the microprocessor (700). According to one exemplary embodiment, the input/output transmitter (730) includes a radiofrequency (RF) transponder tuned to transmit and receive information on a dedicated frequency. According to one exemplary embodiment, the data is transmitted between the I/O transmitter (730) and the display unit (110; FIG. 1) via a 433 MHz frequency.

According to the exemplary configuration illustrated in FIG. 7, various transducers are used to collect information regarding the environmental conditions surrounding the condition sensing module (120). According to one exemplary embodiment, the rainfall transducer (740), the temperature transducer (780), the barometric pressure transducer (750), and the humidity transducer (760) are of the voltage output type. Consequently, physical stimulus of one of these transducers results in a voltage response that is then conditioned by common operational amplifier circuits to amplify and level shift for input to the ADC (710) coupled to the microprocessor (700).

The wind speed transducer (790) and the wind direction transducer (720) include, according to one exemplary embodiment, a reed switch and a rotating magnet, as is known in the art. According to this exemplary embodiment, the wind affects the reed switch and the rotating magnet to actuate a counter. The data produced by the counter is then relayed and analyzed by the microcontroller (700) to determine wind direction and wind speed. Further details of environmental sensing transducers may provided by U.S. Pat. No. 5,920,827, the teachings of which are incorporated herein by reference in their entirety.

With all the desired data generated and collected by the condition sensor module (120; FIG. 1), as described above, the data may be transmitted on demand to the display unit (110; FIG. 1) for viewing and analysis by a user.

ALTERNATIVE EMBODIMENTS

Figure 8:
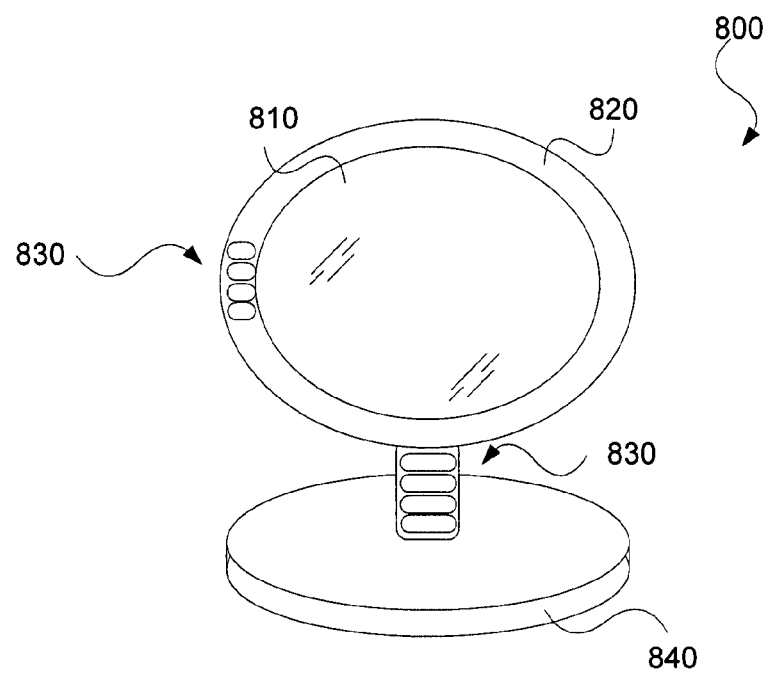
FIG. 8 is a frontal view of a vanity mirror display unit of an exemplary integrated mirror and weather station system, according to one exemplary embodiment.

While the present exemplary integrated mirror and weather station system (100) have been described in the context of a display unit (110) configured for use in a shower, the display unit may assume any number of configurations. More specifically, FIG. 8 illustrates an alternative display unit configuration, according to one exemplary embodiment. As shown, the display unit (110) may assume the form of a vanity mirror configuration (800). According to this exemplary embodiment, the vanity mirror display unit includes a mirror frame (820) and a magnifying mirror (810) for use in applying and/or removing makeup. Additionally, as illustrated in FIG. 8, the magnifying mirror (810) is supported by a structural base (840). According to the vanity mirror configuration (800) illustrated in FIG. 8, a number of weather station displays (830) associated with a weather station module (210; FIG. 2) are positioned near the magnifying mirror (810). According to this exemplary embodiment, someone using the magnifying mirror during daily preparations may be readily apprised of weather conditions to aid in a selection of clothing, makeup, hair products, and/or planned activities.

Figure 9:
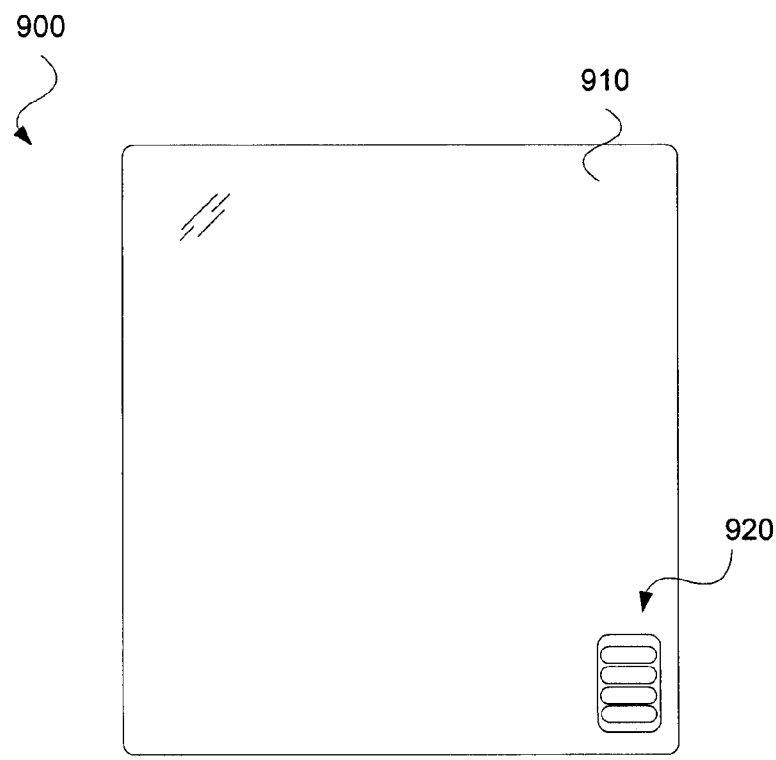
FIG. 9 is a frontal view of a mirror configuration for use in an exemplary integrated mirror and weather station system, according to one exemplary embodiment.

Further, the weather station displays may be integrated into the body of the mirror, according to one exemplary embodiment. As illustrated in FIG. 9, a mirror (900) may include a mirrored substrate (910). A number of integral weather station displays (920) may be coupled to a non-reflective portion of the mirrored substrate (910). According to this exemplary embodiment, observance of the received weather conditions is further enhanced.

In conclusion, the present exemplary system and method for detecting outside weather conditions and displaying the weather conditions to a user during their daily preparations includes a mirrored surface and an integral weather station. According to the present exemplary system and method, a user may prepare for daily activities and complete daily grooming activities, while being apprised of weather conditions.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An apparatus for apprising a user of weather conditions, comprising:
   a remote weather sensing unit configured to wirelessly transmit weather conditions;
   a weather condition display module configured to receive said transmitted weather conditions; and
   a reflective surface integrally coupled to said weather condition display.

2. The apparatus of claim 1, wherein said weather condition display module and said reflective surface are disposed in a single housing.

3. The apparatus of claim 2, wherein said single housing is configured to hermetically seal said weather condition display module.

4. The apparatus of claim 1, wherein said reflective surface comprises a fog free mirror.

5. The apparatus of claim 4, wherein said fog free mirror comprises:
   a reflective substrate; and
   an organic coating of fog resistant material disposed on a reflective surface of said reflective substrate.

6. The apparatus of claim 4, further comprising a razor holder coupled to said housing.

7. The apparatus of claim 1, wherein said reflective surface comprises a magnifying vanity mirror.

8. The apparatus of claim 1, wherein said weather condition display module comprises:
   a microprocessor;
   a input/output module coupled to said microprocessor, wherein said input/output module is configured to send and receive data with said remote weather sensing unit; and
   a plurality of optical displays configured to optically represent weather data received from said remote weather sensing unit.

9. The apparatus of claim 8, wherein said plurality of optical displays are configured to display current time, current date, sensed outside humidity, sensed outside temperature, and sensed outside barometric pressure.

10. The apparatus of claim 8, further comprising a plurality of controls configured to modify said plurality of optical displays.

11. The apparatus of claim 1, wherein said weather condition display is disposed within said reflective surface.

12. The apparatus of claim 1, wherein said remote weather sensing unit comprises:
    a microprocessor;
    a power supply electrically coupled to said microprocessor;
    a wireless input/output module communicatively coupled to said microprocessor; and
    at least one condition transducer communicatively coupled to said microprocessor.

13. The apparatus of claim 12, wherein said at least one condition transducer comprises a rainfall transducer, a humidity transducer, a wind direction transducer, a wind speed transducer, a barometric pressure transducer, and a temperature transducer.

14. The apparatus of claim 12, wherein said wireless input/output module comprises a radio frequency transponder.

15. The apparatus of claim 1, further comprising a plurality of remote weather sensing modules.

16. An apparatus comprising:
    a remote weather sensing unit configured to wirelessly transmit weather conditions, said remote weather sensing unit including a microprocessor, a power supply electrically coupled to said microprocessor, a wireless input/output module communicatively coupled to said microprocessor, and at least one condition transducer communicatively coupled to said microprocessor;
    a weather condition display module configured to receive said transmitted weather conditions, said weather condition display module including a microprocessor, a input/output module coupled to said microprocessor, wherein said input/output module is configured to send and receive data with said remote weather sensing unit, and a plurality of optical displays configured to optically represent weather data received from said remote weather sensing unit;
    a fog free mirror integrally coupled in a single waterproof housing with said weather condition display, wherein said single waterproof housing is configured to hermetically seal said weather condition display module; and a razor holder coupled to said single housing.

17. The apparatus of claim 16, wherein said fog free mirror comprises:
    a reflective substrate; and
    an organic coating of fog resistant material disposed on a reflective surface of said reflective substrate.

18. An apparatus comprising:
    a remote weather sensing unit configured to wirelessly transmit weather conditions, said remote weather sensing unit including a microprocessor, a power supply electrically coupled to said microprocessor, a wireless input/output module communicatively coupled to said microprocessor, and at least one condition transducer communicatively coupled to said microprocessor;
    a weather condition display module configured to receive said transmitted weather conditions, said weather condition display module including a microprocessor, a input/output module coupled to said microprocessor, wherein said input/output module is configured to send and receive data with said remote weather sensing unit, and a plurality of optical displays configured to optically represent weather data received from said remote weather sensing unit; and
    a magnifying vanity mirror integrally coupled in a single housing with said weather condition display.

* * * * *